United States Patent
Medles et al.

(10) Patent No.: US 12,048,024 B2
(45) Date of Patent: Jul. 23, 2024

(54) METHOD AND APPARATUS FOR RANDOM ACCESS CHANNEL PREAMBLE DESIGN IN NON-TERRESTRIAL NETWORK COMMUNICATIONS

(71) Applicant: MediaTek Singapore Pte. Ltd., Singapore (SG)

(72) Inventors: Abdelkader Medles, Cambridge (GB); Gilles Charbit, Cambridge (GB)

(73) Assignee: MediaTek Singapore Pte. Ltd., Singapore (SG)

( * ) Notice: Subject to any disclaimer, the term of this patent is extended or adjusted under 35 U.S.C. 154(b) by 0 days.

(21) Appl. No.: 17/939,882

(22) Filed: Sep. 7, 2022

(65) Prior Publication Data
US 2023/0007697 A1    Jan. 5, 2023

Related U.S. Application Data

(63) Continuation of application No. 17/012,032, filed on Sep. 3, 2020.

(60) Provisional application No. 62/916,355, filed on Oct. 17, 2019.

(51) Int. Cl.
  *H04W 74/0833* (2024.01)
  *H04L 27/26* (2006.01)

(52) U.S. Cl.
  CPC ..... *H04W 74/0833* (2013.01); *H04L 27/2607* (2013.01); *H04L 27/2636* (2013.01); *H04L 27/266* (2013.01)

(58) Field of Classification Search
  CPC .............................................. H04W 74/0833
  See application file for complete search history.

(56) References Cited

U.S. PATENT DOCUMENTS

| | | | |
|---|---|---|---|
| 2017/0164308 A1* | 6/2017 | Ji | H04J 11/0069 |
| 2017/0223743 A1* | 8/2017 | Lin | H04L 27/2614 |
| 2018/0124830 A1 | 5/2018 | Lin et al. | |
| 2019/0274168 A1* | 9/2019 | Hwang | H04W 74/0833 |

(Continued)

FOREIGN PATENT DOCUMENTS

| | | |
|---|---|---|
| CN | 108702173 A | 10/2018 |
| CN | 109952736 A | 6/2019 |
| WO | WO 2019031864 A1 | 2/2019 |

OTHER PUBLICATIONS

China National Intellectual Property Administration, First Office Action in China Patent Application No. 202011026594.5, Jul. 11, 2023.

(Continued)

*Primary Examiner* — Jason E Mattis
(74) *Attorney, Agent, or Firm* — Han IP PLLC; Andy M. Han

(57) ABSTRACT

Various solutions for random access channel (RACH) preamble design in non-terrestrial network (NTN) communications with respect to user equipment and network apparatus are described. An apparatus may initiate a RACH procedure. The apparatus may determine a fractional frequency offset pattern or a cover code across groups of preamble sequences. The apparatus may generate a RACH preamble signal according to at least one of the fractional frequency offset pattern and the cover code. The apparatus may transmit the RACH preamble signal to a network node.

8 Claims, 13 Drawing Sheets

(56) References Cited

U.S. PATENT DOCUMENTS

2020/0145152 A1\* 5/2020 Liu .................. H04W 74/0833
2020/0245363 A1\* 7/2020 Kim ...................... H04B 1/713

OTHER PUBLICATIONS

Intel Corporation: "Discussion on TA and PRACH for NTN", 3GPP TSG RAN WG1 #98, R1-1908643, Aug. 30, 2019.

\* cited by examiner

FIG. 8

| Preamble Format | Detection Prababiliy | |
|---|---|---|
| | SNR = -2 dB | SNR = 5 dB |
| Format 1 | 100% | 100% |
| Format 2 | 99.5% | 100% |

RACH PREAMBLE DETECTION PERFORMANCE
FOR RESIDUAL FREQUENCY OFFSET 7.67 KHz

METHOD AND APPARATUS FOR RANDOM ACCESS CHANNEL PREAMBLE DESIGN IN NON-TERRESTRIAL NETWORK COMMUNICATIONS

CROSS REFERENCE TO RELATED PATENT APPLICATION(S)

The present disclosure is part of a continuation of U.S. patent application Ser. No. 17/012,032, filed on 3 Sep. 2020, which is a non-provisional application claiming the priority benefit of U.S. Patent Application No. 62/916,355, filed on 17 Oct. 2019, the contents of which herein being incorporated by reference in their entirety.

TECHNICAL FIELD

The present disclosure is generally related to mobile communications and, more particularly, to random access channel (RACH) preamble design in non-terrestrial network (NTN) communications with respect to user equipment and network apparatus in mobile communications.

BACKGROUND

Unless otherwise indicated herein, approaches described in this section are not prior art to the claims listed below and are not admitted as prior art by inclusion in this section.

A non-terrestrial network (NTN) refers to a network, or a segment of network(s), using radio frequency (RF) resources on board a satellite or an unmanned aircraft system (UAS) platform. A typical scenario of an NTN providing access to a user equipment (UE) involves either NTN transparent payload, with the satellite or UAS platform acting as a relay, or NTN regenerative payload, with a base station (e.g., gNB) on board the satellite or UAS platform.

In Long-Term Evolution (LTE) or Narrowband Internet of Things (NB-IoT), a RACH procedure is introduced to establish a connection with and obtain resource from a network node. In the first step of the RACH procedure, the UE needs to transmit a RACH preamble signal (e.g., Message 1) to the network node. The physical layer random access preamble is based on single-subcarrier frequency-hopping symbol groups. Current physical RACH (PRACH) design for NB-IoT uses frequency hopping pattern to identify different PRACH sequences. For preamble format 0/1, the hopping sequence is determined by the initial subcarrier, but the hopping pattern repeats every 2 sub-carrier spacing (SCS). For preamble format 2, the pattern of PRACH sequences which are separated by 6 indexes is the same, only shifted by multiple of 6 the SCS. However, for the NTN deployment, large differential delay and residual frequency offset within a beam may occur. The maximum residual frequency offset on the hand is more difficult to handle with the current NB-IoT preamble design. Because of the large residual frequency offset, the network node is unable to distinguish between 2 sequences with the same frequency hopping pattern 2 SCS or 6 SCS apart. This could lead to poor detection performance at the network side and could interrupt the RACH procedure or cause failure on the RACH procedure.

Accordingly, for possible large residual frequency offset in NTN communications, how to design RACH preamble signal to improve detection performance at the receiver becomes an important issue in the newly developed wireless communication network. Therefore, there is a need to provide proper RACH preamble design for better detection performance to meet performance requirements under severe NTN deployment scenarios.

SUMMARY

The following summary is illustrative only and is not intended to be limiting in any way. That is, the following summary is provided to introduce concepts, highlights, benefits and advantages of the novel and non-obvious techniques described herein. Select implementations are further described below in the detailed description. Thus, the following summary is not intended to identify essential features of the claimed subject matter, nor is it intended for use in determining the scope of the claimed subject matter.

An objective of the present disclosure is to propose solutions or schemes that address the aforementioned issues pertaining to RACH preamble design in NTN communications with respect to user equipment and network apparatus in mobile communications.

In one aspect, a method may involve an apparatus initiating a RACH procedure. The method may also involve the apparatus determining a fractional frequency offset pattern. The method may further involve the apparatus generating a RACH preamble signal according to the fractional frequency offset pattern. The method may further involve the apparatus transmitting the RACH preamble signal to a network node.

In another aspect, a method may involve an apparatus initiating a RACH procedure. The method may also involve the apparatus determining a cover code across groups of preamble sequences. The method may further involve the apparatus generating a RACH preamble signal according to the cover code. The method may further involve the apparatus transmitting the RACH preamble signal to a network node.

It is noteworthy that, although description provided herein may be in the context of certain radio access technologies, networks and network topologies such as Long-Term Evolution (LTE), LTE-Advanced, LTE-Advanced Pro, 5th Generation (5G), New Radio (NR), Internet-of-Things (IoT), Narrow Band Internet of Things (NB-IoT) and Industrial Internet of Things (IIoT), the proposed concepts, schemes and any variation(s)/derivative(s) thereof may be implemented in, for and by other types of radio access technologies, networks and network topologies. Thus, the scope of the present disclosure is not limited to the examples described herein.

BRIEF DESCRIPTION OF THE DRAWINGS

The accompanying drawings are included to provide a further understanding of the disclosure and are incorporated in and constitute a part of the present disclosure. The drawings illustrate implementations of the disclosure and, together with the description, serve to explain the principles of the disclosure. It is appreciable that the drawings are not necessarily in scale as some components may be shown to be out of proportion than the size in actual implementation in order to clearly illustrate the concept of the present disclosure.

FIG. 8 is a diagram depicting an example scenario under schemes in accordance with implementations of the present disclosure.

FIG. 9 is a table depicting RACH preamble detection performance under schemes in accordance with implementations of the present disclosure.

DETAILED DESCRIPTION OF PREFERRED IMPLEMENTATIONS

Detailed embodiments and implementations of the claimed subject matters are disclosed herein. However, it shall be understood that the disclosed embodiments and implementations are merely illustrative of the claimed subject matters which may be embodied in various forms. The present disclosure may, however, be embodied in many different forms and should not be construed as limited to the exemplary embodiments and implementations set forth herein. Rather, these exemplary embodiments and implementations are provided so that description of the present disclosure is thorough and complete and will fully convey the scope of the present disclosure to those skilled in the art. In the description below, details of well-known features and techniques may be omitted to avoid unnecessarily obscuring the presented embodiments and implementations.

Overview

Implementations in accordance with the present disclosure relate to various techniques, methods, schemes and/or solutions pertaining to RACH preamble design in NTN communications with respect to user equipment and network apparatus in mobile communications. According to the present disclosure, a number of possible solutions may be implemented separately or jointly. That is, although these possible solutions may be described below separately, two or more of these possible solutions may be implemented in one combination or another.

Figure 1:
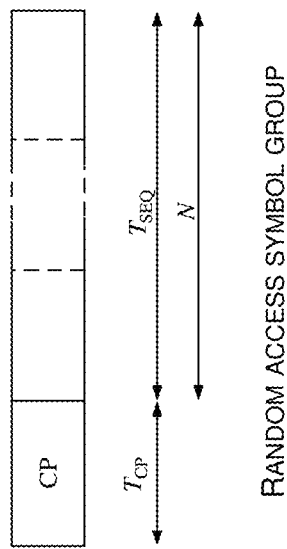
FIG. 1 is a diagram depicting an example random access symbol group and random access preamble parameters under schemes in accordance with implementations of the present disclosure.

FIG. 1 illustrates an example random access symbol group and random access preamble parameters under schemes in accordance with implementations of the present disclosure. The physical layer random access preamble is based on single-subcarrier frequency-hopping symbol groups. A symbol group is illustrated in FIG. 1, consisting of a cyclic prefix (CP) of length $T_{CP}$ and a sequence of N identical symbols with total length $T_{SEQ}$. The total number of symbol groups in a preamble repetition unit is denoted by P. The number of time-contiguous symbol groups is given by G. The random access preamble parameter values for frame structure type 1 are also listed in FIG. 1. The smallest time unit (e.g., sampling duration) defined in NB-IoT is denoted by $T_s$.

Figure 2:
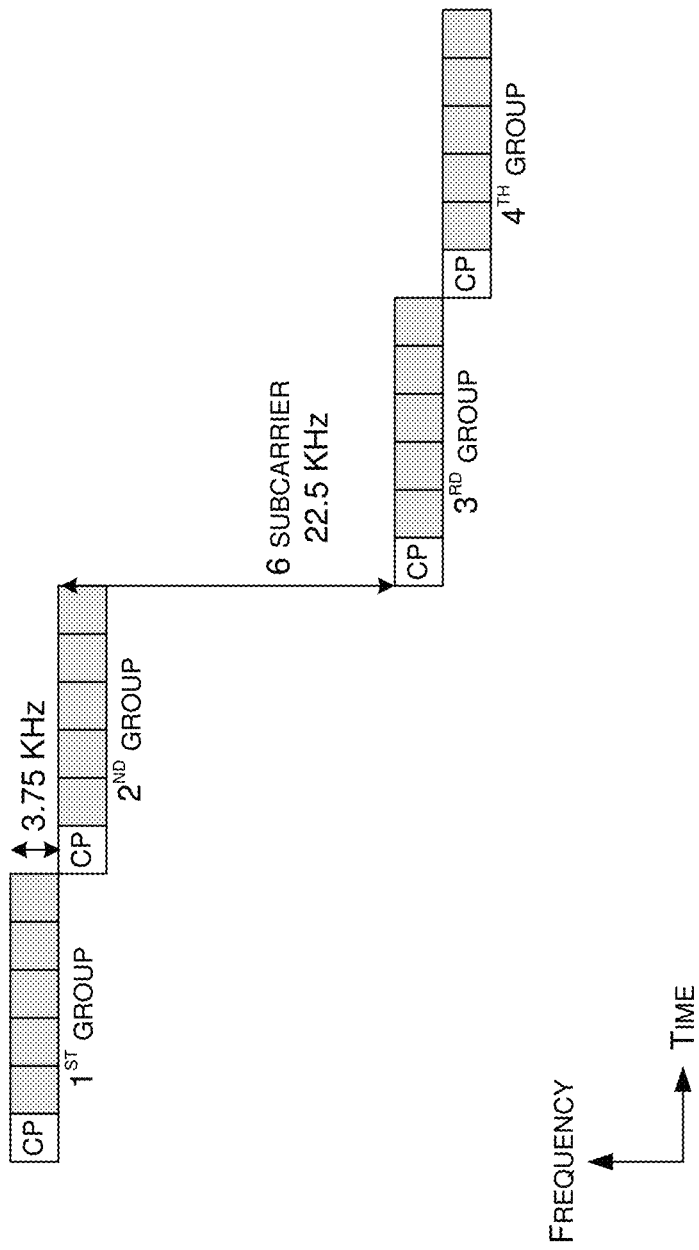
FIG. 2 is a diagram depicting an example NB-IoT preamble format 1 under schemes in accordance with implementations of the present disclosure.

FIG. 2 illustrates an example NB-IoT preamble format 1 under schemes in accordance with implementations of the present disclosure. Each symbol group comprises a CP and 5 identical symbols. The total number of symbol groups in a preamble repetition unit is 4. The number of time-contiguous symbol groups is 4 (not shown in FIG. 2). Current physical PRACH design for NB-IoT uses frequency hopping pattern to identify different PRACH sequences. Preamble format 0/1 has an SCS of 3.75 kHz. The hopping sequence is determined by the initial subcarrier, but the hopping pattern repeats every 2 SCS. For example, the pattern of even PRACH sequences is the same, only shifted by multiple of 2 the SCS (e.g., 2*SCS=7.5 kHz). For preamble format 2, the pattern of PRACH sequences which are separated by 6 indexes is the same, only shifted by multiple of 6 the SCS (e.g., 6*SCS=7.5 kHz). The maximum residual frequency offset on the hand is more difficult to handle with the current NB-IoT preamble design.

Because of the large residual frequency offset (e.g., 7.67 kHz>2 SCS where SCS=3.75 kHz), the network node is unable to distinguish between 2 sequences with the same frequency hopping pattern 2 SCS apart. The same concern is also valid for preamble format 2 with SCS=1.25 kHz, where the hopping pattern repeat every 6 SCS, in which case the network node is unable to distinguish between 2 sequences which are apart 6 SCS. This could lead to poor detection performance at the network side.

Figure 3:
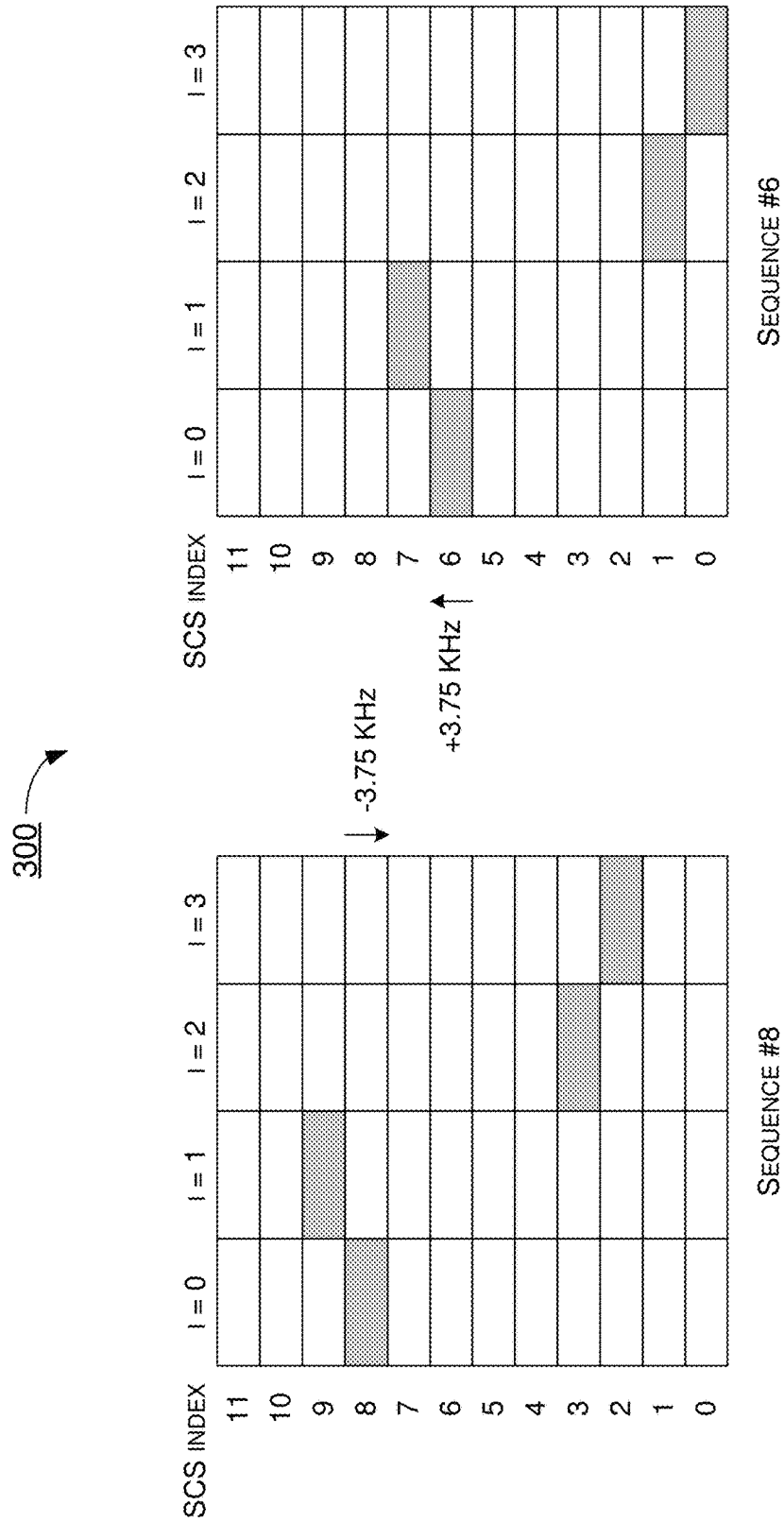
FIG. 3 is a diagram depicting an example scenario under schemes in accordance with implementations of the present disclosure.

FIG. 3 illustrates an example scenario 300 under schemes in accordance with implementations of the present disclosure. Scenario 300 involves a UE and a network node, which may be a part of a wireless communication network (e.g., an LTE network, a 5G network, an NR network, an IoT network, an NB-IoT network or an NTN network). Scenario 300 illustrates even sequences in narrowband PRACH (NPRACH) preamble format 0/1. For NTN deployments depending on the beam size, the intra-beam (e.g., intra-cell) frequency offset could be +/−3.75 kHz or higher. Given that the hopping pattern of the NB-IoT preamble is repeated among sequences with spacing multiple of 7.5 kHz, therefore current NB-IoT design will confuse sequences with frequency offset>+/−3.75 kHz. For example, in a case that the frequency offset of sequence #8 is −3.75 kHz and the frequency offset of sequence #6 is +3.75 kHz, sequence #8 and sequence #6 will collide/overlap with each other leading to confusion at the receiver side. The purpose of the RACH preamble design proposed in the present disclosure is to remove such ambiguity.

Figure 4:
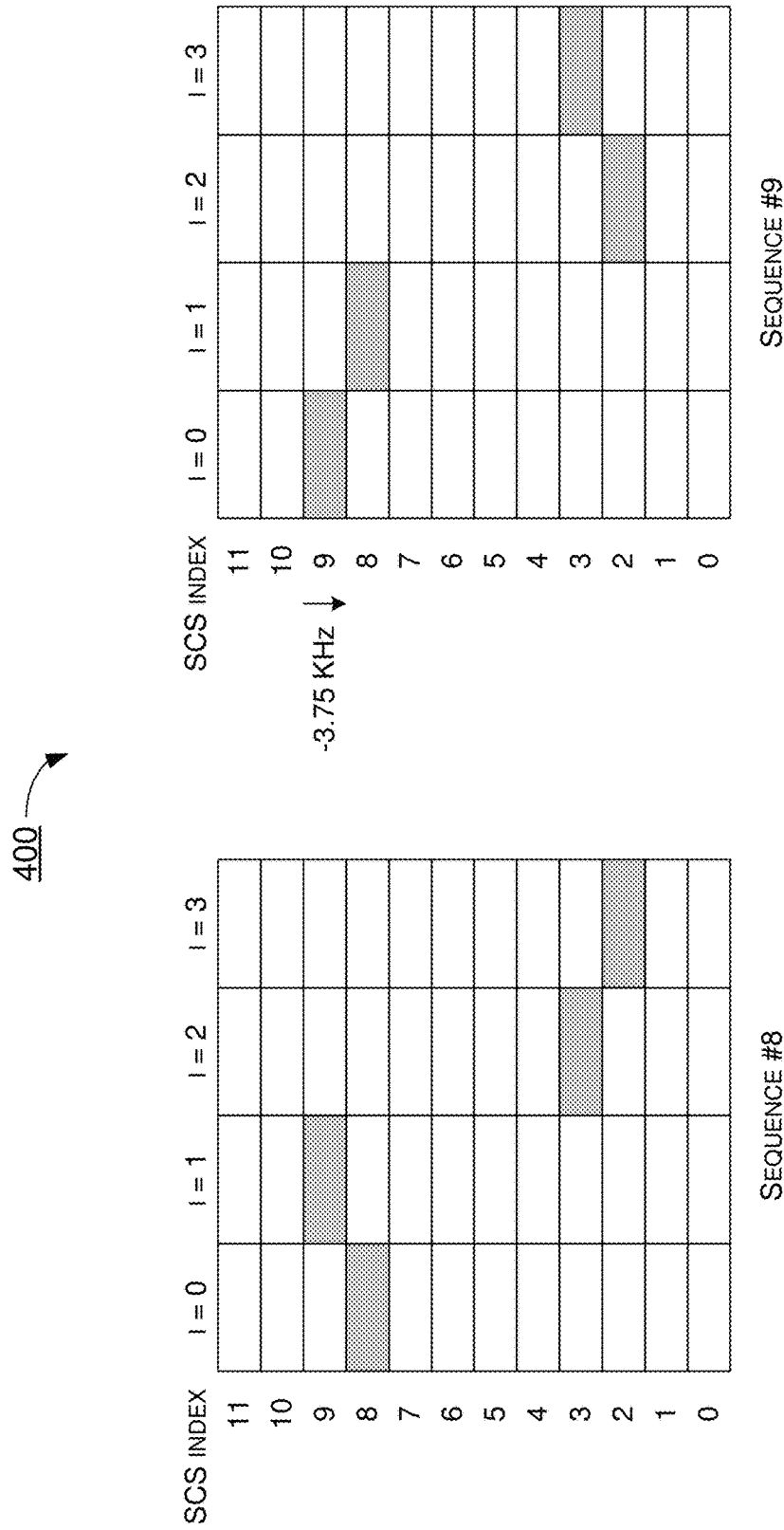
FIG. 4 is a diagram depicting an example scenario under schemes in accordance with implementations of the present disclosure.

FIG. 4 illustrates an example scenario 400 under schemes in accordance with implementations of the present disclosure. Scenario 400 involves a UE and a network node, which may be a part of a wireless communication network (e.g., an LTE network, a 5G network, an NR network, an IoT network, an NB-IoT network or an NTN network). Scenario 400 illustrates adjacent sequences in NPRACH preamble format 0/1. Between PRACH sequences which are not the same (e.g., even compared to odd for preamble format 0/1), the sequences could have a large correlation with large frequency offset. As shown in FIG. 4, even and odd adjacent sequences could have 50% collision/correlation due to frequency offset of +3.75 kHz or −3.75 kHz. For example, for sequence #8 and sequence #9, in a case that the frequency offset of sequence #9 is −3.75 kHz, 50% of the groups will collide/overlap with each other. Such high collision/correlation will impact detection performance at the receiver (e.g., gNodeB). A straightforward solution is to configure a gap in frequency domain of +/−2 times max residual frequency offset between RACH preamble resources. This solution may avoid possible collision between the RACH preambles due to max residual frequency offset of +3.75 kHz or −3.75 kHz. However, this solution is not resource efficient and may waste radio resources. The purpose of the RACH preamble design proposed in the present disclosure is to reduce collision/correlation of adjacent sequences and avoid resource inefficient.

In view of the above, the present disclosure proposes a number of schemes pertaining to RACH preamble design in NTN communications with respect to the UE and the network apparatus. According to the schemes of the present disclosure, a low impact change of the preamble sequence design may be used by introducing a fractional frequency offset pattern per preamble. When initiating a RACH procedure, the UE may use a fractional frequency offset pattern to determine the RACH preamble signal. Alternatively or jointly, the UE may also use a cover code to determine the RACH preamble signal. The UE may apply the cover code to the RACH preamble sequences. Such new RACH preamble design can make RACH preamble signal robust to residual frequency offset. Accordingly, the receiver (e.g., network node) may be able to well distinguish between the sequences. By using the new RACH preamble design, detection performance at the receiver may be significantly improved and meet performance requirements under severe NTN deployment scenarios.

Figure 5:
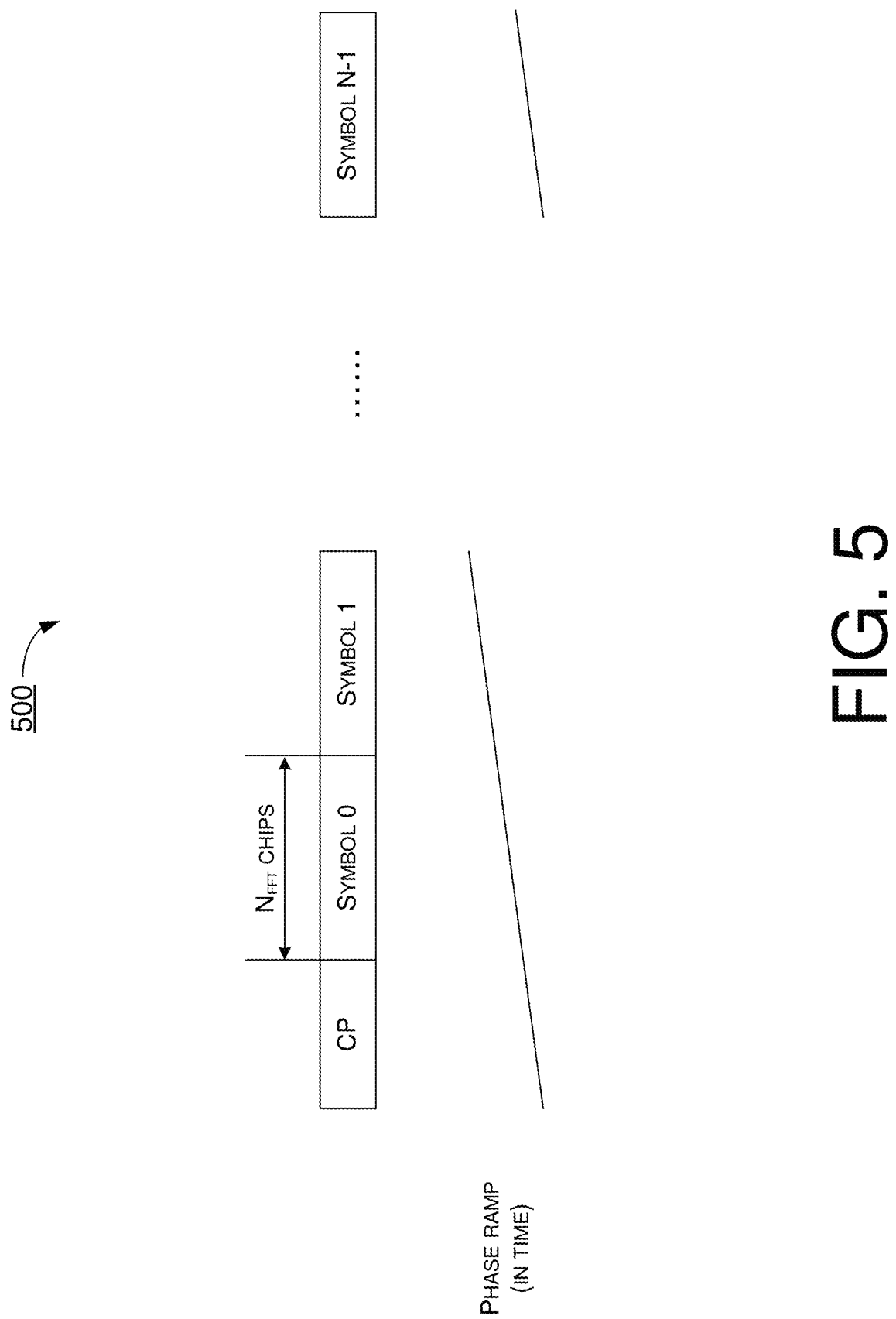
FIG. 5 is a diagram depicting an example scenario under schemes in accordance with implementations of the present disclosure.

FIG. 5 illustrates an example scenario 500 under schemes in accordance with implementations of the present disclosure. Scenario 500 involves a UE and a network node, which may be a part of a wireless communication network (e.g., an LTE network, a 5G network, an NR network, an IoT network, an NB-IoT network or an NTN network). In order to synchronize with and obtain resources from the network node, the UE may be configured to initiate a RACH procedure. The first step in the RACH procedure is to transmit a RACH preamble signal (e.g., Message 1) to the network node. Specifically, for generating the RACH preamble signal, the UE may be configured to determine a fractional frequency offset pattern. Then, the UE may generate a RACH preamble signal according to the fractional frequency offset pattern. The UE may transmit the RACH preamble signal to the network node. In generating a RACH preamble signal, the UE may allocate the fractional frequency offset pattern across preamble sequences based on cyclic shift of a base fractional frequency offset pattern. The UE may determine a cyclic shift amount to avoid repeating identical fractional frequency offset pattern across adjacent preamble sequences.

The fractional frequency offset pattern may comprise a sequence of fractional frequency offset represented by p/N. N denotes a number of symbols in a random access symbol group. p denotes a sequence of integers between −N/2 and N/2. For each symbol group of the RACH preamble signal, one symbol group may be transmitted over N symbols with a total duration $N \cdot N_{fft} + N_{cp}$ chips. $N_{fft}$ denotes a number of Fast Fourier Transform (FFT). $N_{cp}$ denotes a number of cyclic prefix. The UE may apply the fractional frequency offset pattern post FFT to the random access symbol group in the RACH preamble signal.

Given that the duration is N symbols, the UE may apply fractional frequency offset $f=(p/N) \cdot SCS$ with $-N/2 \leq p \leq N/2$. The UE may apply the phase offset post FFT by using a phasor $$e^{j2\pi n T_c \cdot \frac{p}{N} \cdot SCS},$$

$n=-N_{CP}, -N_{CP}+1, \ldots, N \cdot N_{fft}-1$. $T_c$ may be equal to, for example, 1/240 kHz and $N_{fft}$ may be equal to, for example, 64. With such fractional phasor, the CP prefix may be preserved since $$e^{j2\pi N \cdot N_{fft} T_c \cdot \frac{p}{N} \cdot SCS} = 1.$$

The modified preamble baseband signal can be written as the following equation/representation.

$$s_i(t) = \beta_{NPRACH} e^{j2\pi (n_{SC}^{RA}(i) + p_{SC}^{RA}(i)/N + Kk_0 + 1/2)\Delta f_{RA}(t - T_{CP})}$$

$p_{SC}^{RA}(i)/N$ $i=0, \ldots, G-1$ is the sequence of the fractional frequency offset which depends on the first subcarrier in the repetition $\tilde{n}_{SC}^{RA}(0)=$init, where $n_{SC}^{RA}(i)=n_{start}+\tilde{n}_{SC}^{RA}(0)$ and $\Delta f_{RA}=SCS$. For preamble format 0/1, N=5 and G=4. For preamble format 2, N=3 and G=6. The value of t is within the range of $0 \leq t \leq T_{SEQ}+T_{CP}$. $\beta_{NPRACH}$ is an amplitude scaling factor in order to conform to the transmit power $P_{NPRACH}$. $k_0=-N_{sc}^{UL}/2$ and $K=\Delta f/\Delta f_{RA}$ accounts for the difference in subcarrier spacing between the random access preamble and uplink data transmission. The location in the frequency domain controlled by the parameter $n_{SC}^{RA}(i)$. The variable $\Delta f_{RA}$ is given by 1.25 kHz or 3.75 kHz.

Figure 6:
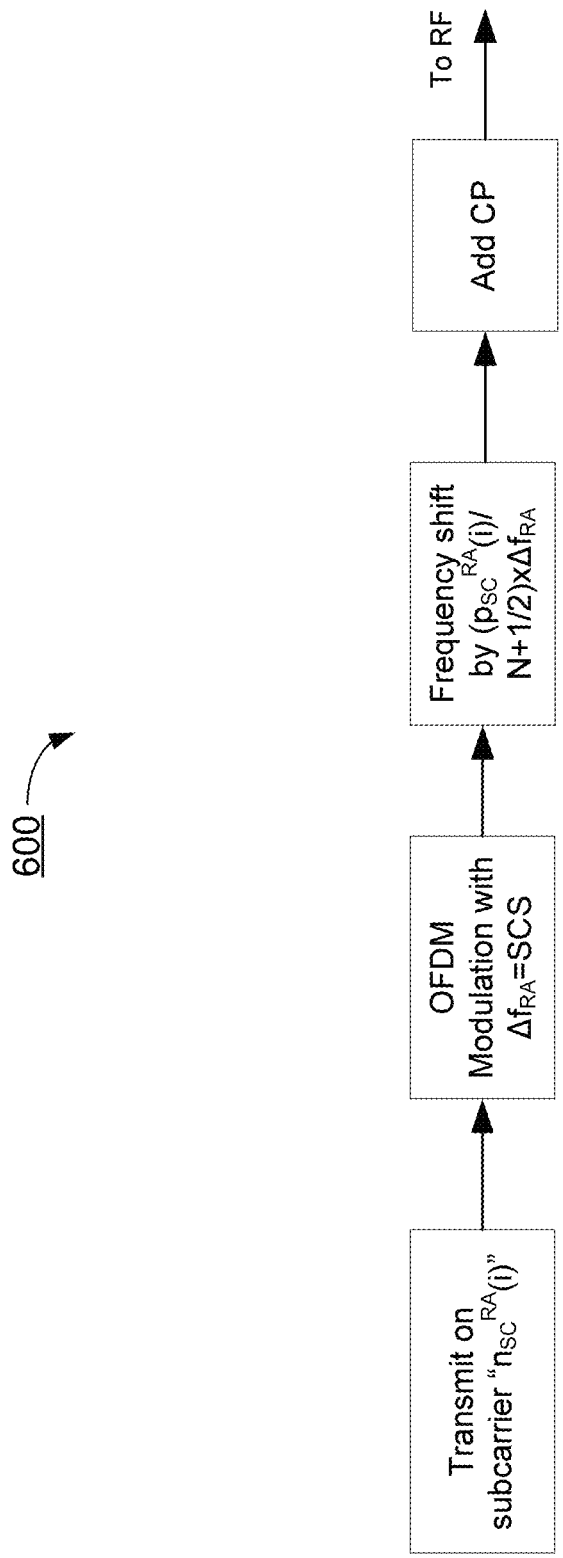
FIG. 6 is a diagram depicting an example transmitter implementation under schemes in accordance with implementations of the present disclosure.

FIG. 6 illustrates an example transmitter implementation 600 under schemes in accordance with implementations of the present disclosure. At the transmitter (e.g., UE), the UE may be configured to transmit the preamble signal on sub-carrier $n_{SC}^{RA}(i)$. The UE may perform orthogonal frequency division multiplexing (OFDM) with $\Delta f_{RA}=SCS$. Then, the UE may perform frequency shift by $p_{SC}^{RA}(i)/N + 1/2)\Delta f_{RA}$. Further, the UE may add CP to the preamble signal and send the preamble signal to the radio frequency (RF) front end. This implementation may effectively correspond to a phase ramp with frequency $p_{SC}^{RA}(i)/N \cdot SCS$ which is applied per symbol group. The sequence $p_{SC}^{RA}(i)/N$ $i=0, \ldots, G-1$ is preamble sequence dependent. Alternative implementations where the SCS is made smaller equal to $\Delta f_{RA}=SCS/N$ and the fractional frequency offset is re-interpreted as allocation of subcarrier '$n_{SC}^{RA}(i)N+p_{SC}^{RA}(i)$' is also possible corresponding to $s_i(t)$.

Figure 7:
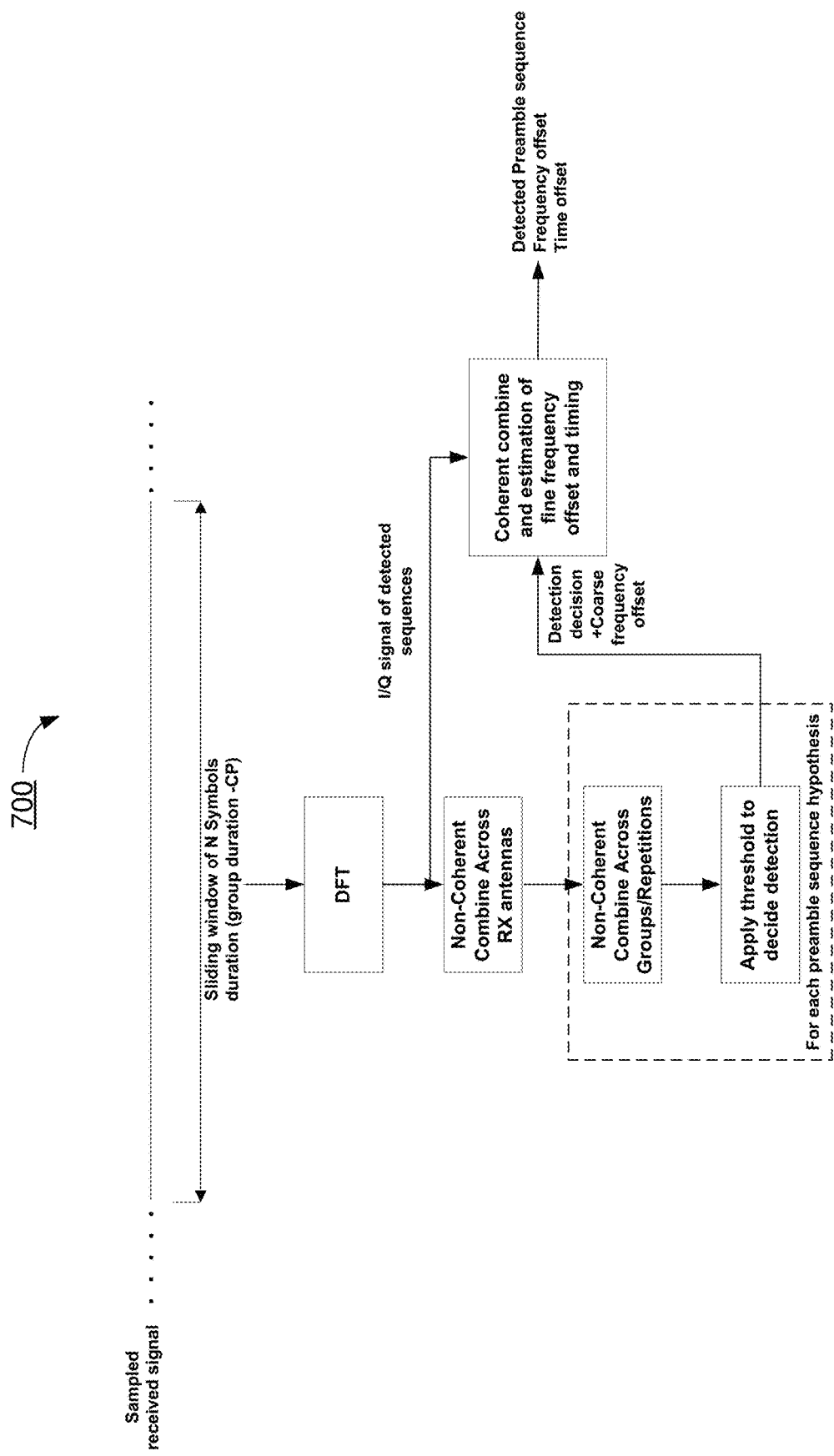
FIG. 7 is a diagram depicting an example receiver implementation under schemes in accordance with implementations of the present disclosure.

FIG. 7 illustrates an example receiver implementation 700 under schemes in accordance with implementations of the present disclosure. The illustrated receiver 700 is composed of 2 main stages. One main stage may comprise non-coherent combine and preamble sequence detection. The other main stage may comprise coherent combine with frequency offset and timing estimate. In case the initial timing error is larger than the CP, the detection algorithm may be run multiple times by shifting the Discrete Fourier Transform (DFT) window by CP duration each time. The receiver may use a DFT with a size corresponding to the N symbols of the group to demodulate the sequence.

In some implementations, variety of designs of the pattern $p_{SC}^{RA}(i)$ are possible. One example is to generate $p_{SC}^{RA}(i)$ from a base pattern p of length G. Then $$p_{SC}^{RA}(i) = p\left(\mathrm{mod}\left(i + \tilde{n}_{SC}^{RA}(0) + \left\lfloor \frac{\tilde{n}_{SC}^{RA}(0)}{G} \right\rfloor, G\right)\right).$$

Figure 8:
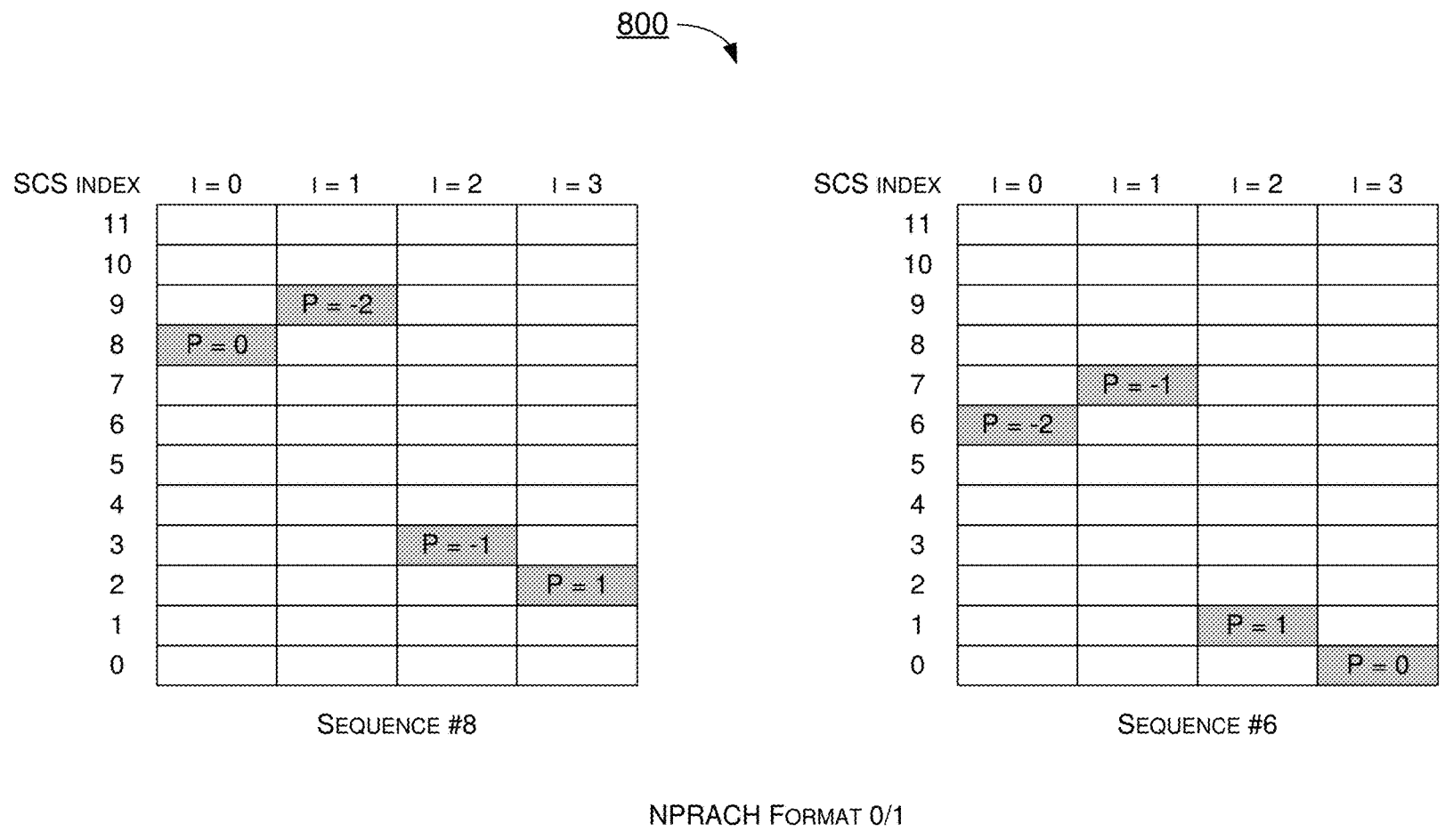

This allocation may guarantee that, to repeat the pattern on another sequence starting with a subcarrier number of the same parity, the 2 sequences are apart by at least 2×(G−1) subcarriers. The pattern p is designed to minimize the collisions between adjacent sequences. FIG. 8 illustrates an example scenario 800 under schemes in accordance with implementations of the present disclosure. Scenario 800 illustrates an example of sequence #8 starting sub-carrier=8: $p_{SC}^{RA}=[0\ -2\ -1\ 1]$ and sequence #6 starting sub-carrier=6: $p_{SC}^{RA}=[-2\ -1\ 1\ 0]$ in preamble format 0/1 where SCS=3.75 kHz, N=5 and G=4. This design may correspond to Costas Array. The UE may use the Costas Array design base sequence p=[−1 1 0 −2]. The UE may determine the fractional frequency offset pattern based on the Costas Array. In this example, although the sequences may collide due to frequency shift of 7.5 kHz, but they still have a different pattern. For preamble format 2 (i.e., SCS=1.25 kHz, N=3 and G=6), the UE may use a similar design with a base sequence p=[0 1 0 −1 1 −1]. For example, the sequences may comprise a first sequence starting sub-carrier=30: $p_{SC}^{RA}=[-1\ 0\ 1\ 0\ -1\ 1]$ and a second sequence starting sub-carrier=24: $p_{SC}^{RA}=[1\ -1\ 0\ 1\ 0\ -1]$. Although the sequences may collide due to frequency shift of 6 SCS (e.g., 6*1.25 kHz=7.5 kHz), but they still have a different pattern.

FIG. 9 illustrates RACH preamble detection performance under schemes in accordance with implementations of the present disclosure. Using this relatively minor change to the preamble design as described above, the ambiguity is removed and performance are improved very significantly as shown in FIG. 9. The detection probability for preamble format 1 or 2 can reach nearly 100% with residual frequency offset 7.67 kHz. The new RACH preamble design proposed in the present disclosure comprise two main advantages. One is its minor impact on the preamble design as the fractional frequency offset can be applied post FFT with no impact on RACH capacity or spectral efficiency. The other is that frequency offset ambiguity can be resolved for all possible residual frequency offsets thus allowing to support all potential beam sizes. The correct preamble detection of RACH preamble as shown in FIG. 9 allows the network node to accurately estimate the timing and frequency offset of the UE. Following the initial detection step, the residual timing offset can be corrected via the timing advance command. For the residual frequency offset, a new signaling for the frequency offset uplink correction may need to be introduced to allow inter-UE uplink frequency synchronization.

Figure 10:
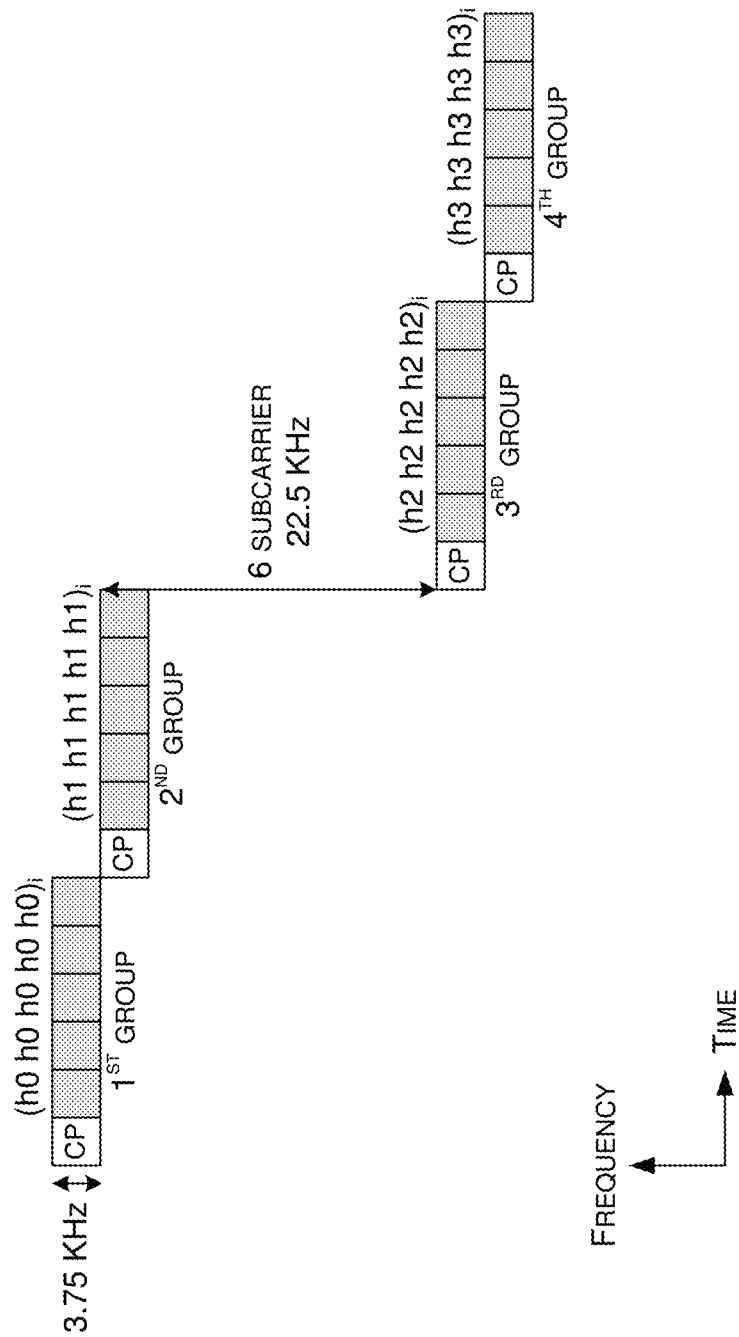
FIG. 10 is a diagram depicting an example NB-IoT preamble format 1 applied with a cover code under schemes in accordance with implementations of the present disclosure.

In some implementation, the UE may use a cover code to determine the RACH preamble signal. FIG. 10 illustrates an example NB-IoT preamble format 1 applied with a cover code under schemes in accordance with implementations of the present disclosure. The idea is to use a cover code to distinguish between sequences. Specifically, the UE may be configured to initiate a RACH procedure. The UE may determine a cover code across groups of preamble sequences. Then, the UE may generate a RACH preamble signal according to the cover code. The UE may transmit the RACH preamble signal to the network node. The UE may allocate the cover code to avoid repeating identical code across the adjacent preamble sequences. The cover code is unit modulus and each group may have single phase. The cover code may be cycled throughout the preamble sequences in a similar way to the fractional offset pattern. The cover code may comprise, for example and without limitation, a Hadamard code (e.g., a permuted columns of Hadamard sequence) or a DFT code (e.g., a permuted columns of DFT). For example, the Hadamard code and the DFT code may comprise a matrix illustrated as below.

$$\mathrm{Hadama\ code} = \begin{bmatrix} (h0\ h1\ h2\ h3)_0 \\ (h0\ h1\ h2\ h3)_1 \\ (h0\ h1\ h2\ h3)_2 \\ (h0\ h1\ h2\ h3)_3 \end{bmatrix} = \begin{bmatrix} 1 & 1 & 1 & 1 \\ 1 & -1 & 1 & -1 \\ 1 & 1 & -1 & -1 \\ 1 & -1 & -1 & 1 \end{bmatrix}$$

$$\mathrm{DFT\ code} = \begin{bmatrix} (h0\ h1\ h2\ h3)_0 \\ (h0\ h1\ h2\ h3)_1 \\ (h0\ h1\ h2\ h3)_2 \\ (h0\ h1\ h2\ h3)_3 \end{bmatrix} = \begin{bmatrix} 1 & 1 & 1 & 1 \\ 1 & j & -1 & -j \\ 1 & -1 & 1 & -1 \\ 1 & -j & -1 & j \end{bmatrix}$$

In some implementation, the UE may combine the cover code with the fractional frequency offset pattern for generating the RACH preamble signal. By this way, the fractional offset pattern allows the distinction through the frequency offset while the cover code allows distinction through code domain. By combining the cover code and the fractional frequency offset pattern, the detection performance may be further improved at the receiver.

Illustrative Implementations

Figure 11:
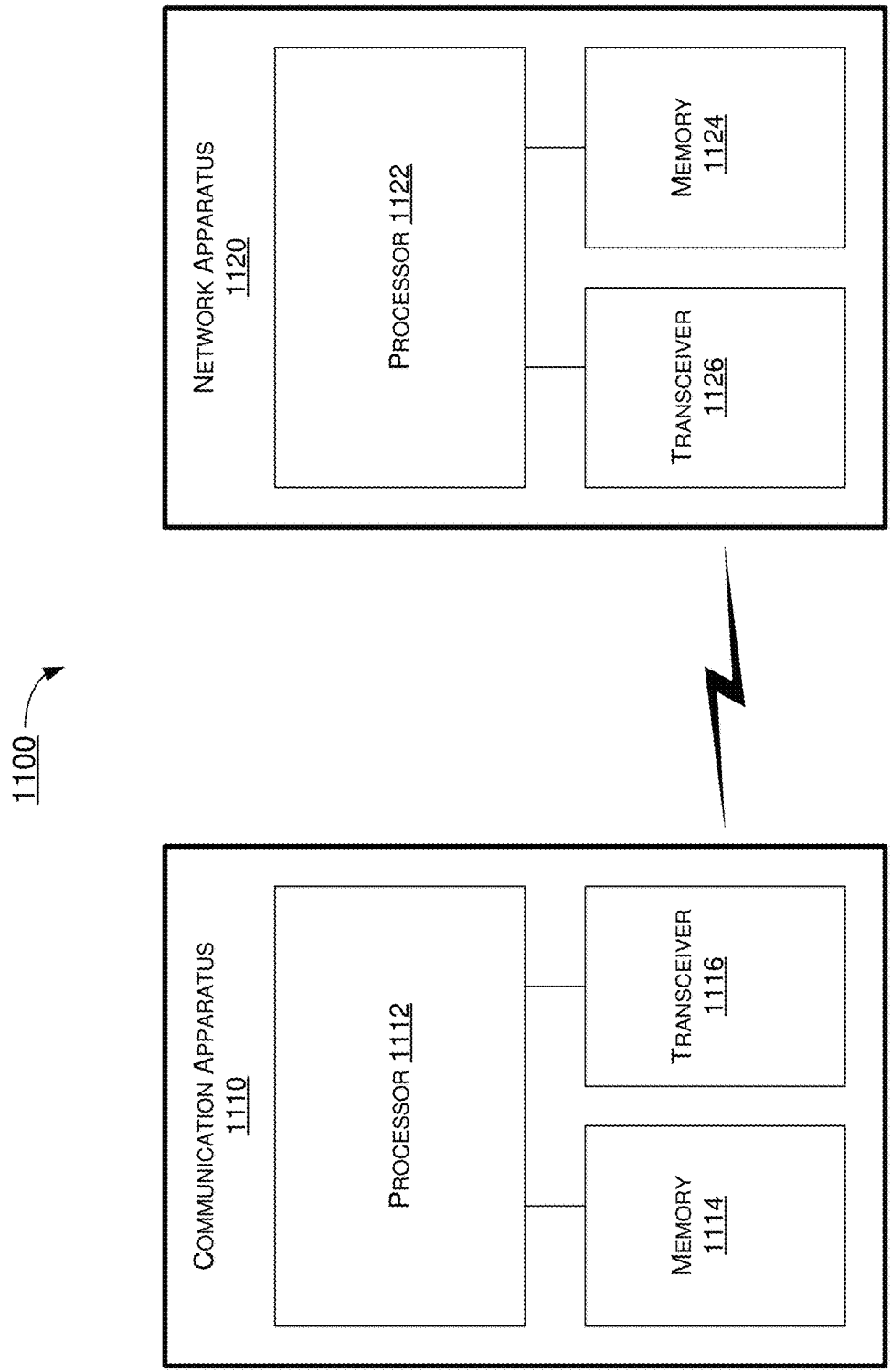
FIG. 11 is a block diagram of an example communication apparatus and an example network apparatus in accordance with an implementation of the present disclosure.

FIG. 11 illustrates an example communication apparatus 1110 and an example network apparatus 1120 in accordance with an implementation of the present disclosure. Each of communication apparatus 1110 and network apparatus 1120 may perform various functions to implement schemes, techniques, processes and methods described herein pertaining to RACH preamble design in NTN communications with respect to user equipment and network apparatus in wireless communications, including scenarios/schemes described above as well as processes 1200 and 1300 described below.

Communication apparatus 1110 may be a part of an electronic apparatus, which may be a UE such as a portable or mobile apparatus, a wearable apparatus, a wireless communication apparatus or a computing apparatus. For instance, communication apparatus 1110 may be implemented in a smartphone, a smartwatch, a personal digital assistant, a digital camera, or a computing equipment such as a tablet computer, a laptop computer or a notebook computer. Communication apparatus 1110 may also be a part of a machine type apparatus, which may be an IoT, NB-IoT, IIoT or NTN apparatus such as an immobile or a stationary apparatus, a home apparatus, a wire communication apparatus or a computing apparatus. For instance, communication apparatus 1110 may be implemented in a smart thermostat, a smart fridge, a smart door lock, a wireless speaker or a home control center. Alternatively, communication apparatus 1110 may be implemented in the form of one or more integrated-circuit (IC) chips such as, for example and without limitation, one or more single-core processors, one or more multi-core processors, one or more reduced-instruction set computing (RISC) processors, or one or more complex-instruction-set-computing (CISC) processors. Communication apparatus 1110 may include at least some of those components shown in FIG. 11 such as a processor 1112, for example. Communication apparatus 1110 may further include one or more other components not pertinent to the proposed scheme of the present disclosure (e.g., internal power supply, display device and/or user interface device), and, thus, such component(s) of communication apparatus 1110 are neither shown in FIG. 11 nor described below in the interest of simplicity and brevity.

Network apparatus 1120 may be a part of an electronic apparatus, which may be a network node such as a base station, a small cell, a router or a gateway. For instance, network apparatus 1120 may be implemented in an eNodeB in an LTE, LTE-Advanced or LTE-Advanced Pro network or in a gNB in a 5G, NR, IoT, NB-IoT, IIoT, or NTN network. Alternatively, network apparatus 1120 may be implemented in the form of one or more IC chips such as, for example and without limitation, one or more single-core processors, one or more multi-core processors, or one or more RISC or CISC processors. Network apparatus 1120 may include at least some of those components shown in FIG. 11 such as a processor 1122, for example. Network apparatus 1120 may further include one or more other components not pertinent to the proposed scheme of the present disclosure (e.g., internal power supply, display device and/or user interface device), and, thus, such component(s) of network apparatus 1120 are neither shown in FIG. 11 nor described below in the interest of simplicity and brevity.

In one aspect, each of processor 1112 and processor 1122 may be implemented in the form of one or more single-core processors, one or more multi-core processors, or one or more CISC processors. That is, even though a singular term "a processor" is used herein to refer to processor 1112 and processor 1122, each of processor 1112 and processor 1122 may include multiple processors in some implementations and a single processor in other implementations in accordance with the present disclosure. In another aspect, each of processor 1112 and processor 1122 may be implemented in the form of hardware (and, optionally, firmware) with electronic components including, for example and without limitation, one or more transistors, one or more diodes, one or more capacitors, one or more resistors, one or more inductors, one or more memristors and/or one or more varactors that are configured and arranged to achieve specific purposes in accordance with the present disclosure. In other words, in at least some implementations, each of processor 1112 and processor 1122 is a special-purpose machine specifically designed, arranged and configured to perform specific tasks including power consumption reduction in a device (e.g., as represented by communication apparatus 1110) and a network (e.g., as represented by network apparatus 1120) in accordance with various implementations of the present disclosure.

In some implementations, communication apparatus 1110 may also include a transceiver 1116 coupled to processor 1112 and capable of wirelessly transmitting and receiving data. In some implementations, communication apparatus 1110 may further include a memory 1114 coupled to processor 1112 and capable of being accessed by processor 1112 and storing data therein. In some implementations, network apparatus 1120 may also include a transceiver 1126 coupled to processor 1122 and capable of wirelessly transmitting and receiving data. In some implementations, network apparatus 1120 may further include a memory 1124 coupled to processor 1122 and capable of being accessed by processor 1122 and storing data therein. Accordingly, communication apparatus 1110 and network apparatus 1120 may wirelessly communicate with each other via transceiver 1116 and transceiver 1126, respectively. To aid better understanding, the following description of the operations, functionalities and capabilities of each of communication apparatus 1110 and network apparatus 1120 is provided in the context of a mobile communication environment in which communication apparatus 1110 is implemented in or as a communication apparatus or a UE and network apparatus 1120 is implemented in or as a network node of a communication network.

In some implementations, processor 1112 may be configured to initiate a RACH procedure. In the first step of the RACH procedure, processor 1112 may be configured to transmit, via transceiver 1116, a RACH preamble signal (e.g., Message 1) to network apparatus 1120. Specifically, for generating the RACH preamble signal, processor 1112 may be configured to determine a fractional frequency offset pattern. Then, processor 1112 may generate a RACH preamble signal according to the fractional frequency offset pattern. Processor 1112 may transmit, via transceiver 1116, the RACH preamble signal to network apparatus 1120. In generating a RACH preamble signal, processor 1112 may allocate the fractional frequency offset pattern across preamble sequences based on cyclic shift of a base fractional frequency offset pattern. Processor 1112 may determine a cyclic shift amount to avoid repeating identical fractional frequency offset pattern across adjacent preamble sequences.

In some implementations, the fractional frequency offset pattern may comprise a sequence of fractional frequency offset represented by p/N. N denotes a number of symbols in a random access symbol group. p denotes a sequence of integers between −N/2 and N/2. For each symbol group of the RACH preamble signal, one symbol group may be transmitted over N symbols with a total duration $N \cdot N_{fft} + N_{cp}$ chips. $N_{fft}$ denotes a number of Fast Fourier Transform (FFT). $N_{cp}$ denotes a number of cyclic prefix. Processor 1112 may apply the fractional frequency offset pattern post FFT to the random access symbol group in the RACH preamble signal.

In some implementations, processor 1112 may apply fractional frequency offset f=(p/N)·SCS with −N/2≤p≤N/2. Processor 1112 may apply the phase offset post FFT by using a phasor $$e^{j2\pi n T_c \cdot \frac{p}{N} \cdot SCS},$$

n=−$N_{CP}$, −$N_{CP}$+1, . . . , $N \cdot N_{fft}$−1. Processor 1112 may determine that $T_c$ is equal to, for example, 1/240 kHz and $N_{fft}$ may be equal to, for example, 64. With such fractional phasor, the CP prefix may be preserved since $$e^{j2\pi N \cdot N_{fft} T_c \cdot \frac{p}{N} \cdot SCS} = 1.$$

In some implementations, processor 1112 may generate the modified preamble baseband signal according to the following equation/representation.

$$s_i(t) = \beta_{NPRACH} e^{j2\pi \left(n_{SC}^{RA}(i) + p_{SC}^{RA}(i)/N + Kk_0 + 1/2\right) \Delta f_{RA}(t - T_{CP})}$$

$p_{SC}^{RA}(i)/N$ i=0, ..., G−1 is the sequence of the fractional frequency offset which depends on the first subcarrier in the repetition $ñ_{SC}^{RA}(0)$=init, where $n_{SC}^{RA}(i)=n_{start}+ñ_{SC}^{RA}(0)$ and $\Delta f_{RA}$=SCS. For preamble format 0/1, N=5 and G=4. For preamble format 2, N=3 and G=6. The value of t is within the range of $0 \leq t \leq T_{SEQ}+T_{CP}$. $\beta_{NPRACH}$ is an amplitude scaling factor in order to conform to the transmit power $P_{NPRACH}$. $k_0 = -N_{sc}^{UL}/2$ and $K=\Delta f/\Delta f_{RA}$ accounts for the difference in subcarrier spacing between the random access preamble and uplink data transmission. The location in the frequency domain controlled by the parameter $n_{SC}^{RA}(i)$. The variable $\Delta f_{RA}$ is given by 1.25 kHz or 3.75 kHz.

In some implementations, communication apparatus 1110 may comprise implementation 600 as illustrated in FIG. 6. For example, processor 1112 may be configured to transmit the preamble signal on sub-carrier $n_{SC}^{RA}(i)$. Processor 1112 may perform orthogonal frequency division multiplexing (OFDM) with $\Delta f_{RA}$=SCS. Then, processor 1112 may perform frequency shift by $p_{SC}^{RA}(i)/N+1/2)\Delta f_{RA}$. Further, processor 1112 may add CP to the preamble signal and send the preamble signal to the radio frequency (RF) front end (e.g., transceiver 1116). This implementation may effectively correspond to a phase ramp with frequency $p_{SC}^{RA}(i)/N \cdot SCS$ which is applied per symbol group. The sequence $p_{SC}^{RA}(i)/N$ i=0, ..., G−1 is preamble sequence dependent. Alternative implementations where the SCS is made smaller equal to $\Delta f_{RA}$=SCS/N and the fractional frequency offset is re-interpreted as allocation of subcarrier '$n_{SC}^{RA}(i)N+p_{SC}^{RA}(i)$' is also possible corresponding to $s_i(t)$.

In some implementations, network apparatus 1120 may comprise implementation 700 as illustrated in FIG. 7. Network apparatus 1120 may be composed of 2 main stages. One main stage may comprise non-coherent combine and preamble sequence detection. The other main stage may comprise coherent combine with frequency offset and timing estimate. In case the initial timing error is larger than the CP, the detection algorithm may be run multiple times by shifting the DFT window by CP duration each time. The receiver may use a DFT with a size corresponding to the N symbols of the group to demodulate the sequence.

In some implementations, processor 1112 may use variety of designs of the pattern $p_{SC}^{RA}(i)$. Processor 1112 may generate $p_{SC}^{RA}(i)$ from a base pattern p of length G. Then $$p_{SC}^{RA}(i) = p\left(\mathrm{mod}\left(i + ñ_{SC}^{RA}(0) + \left\lfloor \frac{ñ_{SC}^{RA}(0)}{G} \right\rfloor, G\right)\right).$$

This allocation may guarantee that, to repeat the pattern on another sequence starting with a subcarrier number of the same parity, the 2 sequences are apart by at least 2×(G−1) subcarriers. Processor 1112 may determine the pattern p so as to minimize the collisions between adjacent sequences. For example, processor 1112 may determine sequence #8 as starting sub-carrier=8: $p_{SC}^{RA}$=[0 −2 −1 1] and sequence #6 as starting sub-carrier=6: $p_{SC}^{RA}$=[−2 −1 1 0] in preamble format 0/1 where SCS=3.75 kHz, N=5 and G=4. This design may correspond to Costas Array. Processor 1112 may use the Costas Array design base sequence p=[−1 1 0 −2]. Processor 1112 may determine the fractional frequency offset pattern based on the Costas Array. In this example, although the sequences may collide due to frequency shift of 7.5 kHz, but they still have a different pattern. For preamble format 2 (i.e., SCS=1.25 kHz, N=3 and G=6), processor 1112 may use a similar design with a base sequence p=[0 1 0 −1 1 −1]. For example, processor 1112 may determine a first sequence as starting sub-carrier=30: $p_{SC}^{RA}$=[−1 0 1 0 −1 1] and a second sequence as starting sub-carrier=24: $p_{SC}^{RA}$=[1 −1 0 1 0 −1]. Although the sequences may collide due to frequency shift of 6 SCS (e.g., 6*1.25 kHz=7.5 kHz), but they still have a different pattern.

In some implementation, processor 1112 may use a cover code to determine the RACH preamble signal. Processor 1112 may use a cover code to distinguish between sequences. Specifically, processor 1112 may be configured to initiate a RACH procedure. Processor 1112 may determine a cover code across groups of preamble sequences. Then, processor 1112 may generate a RACH preamble signal according to the cover code. Processor 1112 may transmit, via transceiver 1116, the RACH preamble signal to the network node. Processor 1112 may allocate the cover code to avoid repeating identical code across the adjacent preamble sequences. The cover code is unit modulus and each group may have single phase. Processor 1112 may cycle the cover code throughout the preamble sequences in a similar way to the fractional offset pattern. The cover code may comprise, for example and without limitation, a Hadamard code (e.g., a permuted columns of Hadamard sequence) or a DFT code (e.g., a permuted columns of DFT).

In some implementation, processor 1112 may combine the cover code with the fractional frequency offset pattern for generating the RACH preamble signal. In addition to use either the fractional frequency offset pattern or the cover code, processor 1112 may use both the fractional frequency offset pattern and the cover code to generate the RACH preamble signal.

Figure 12:
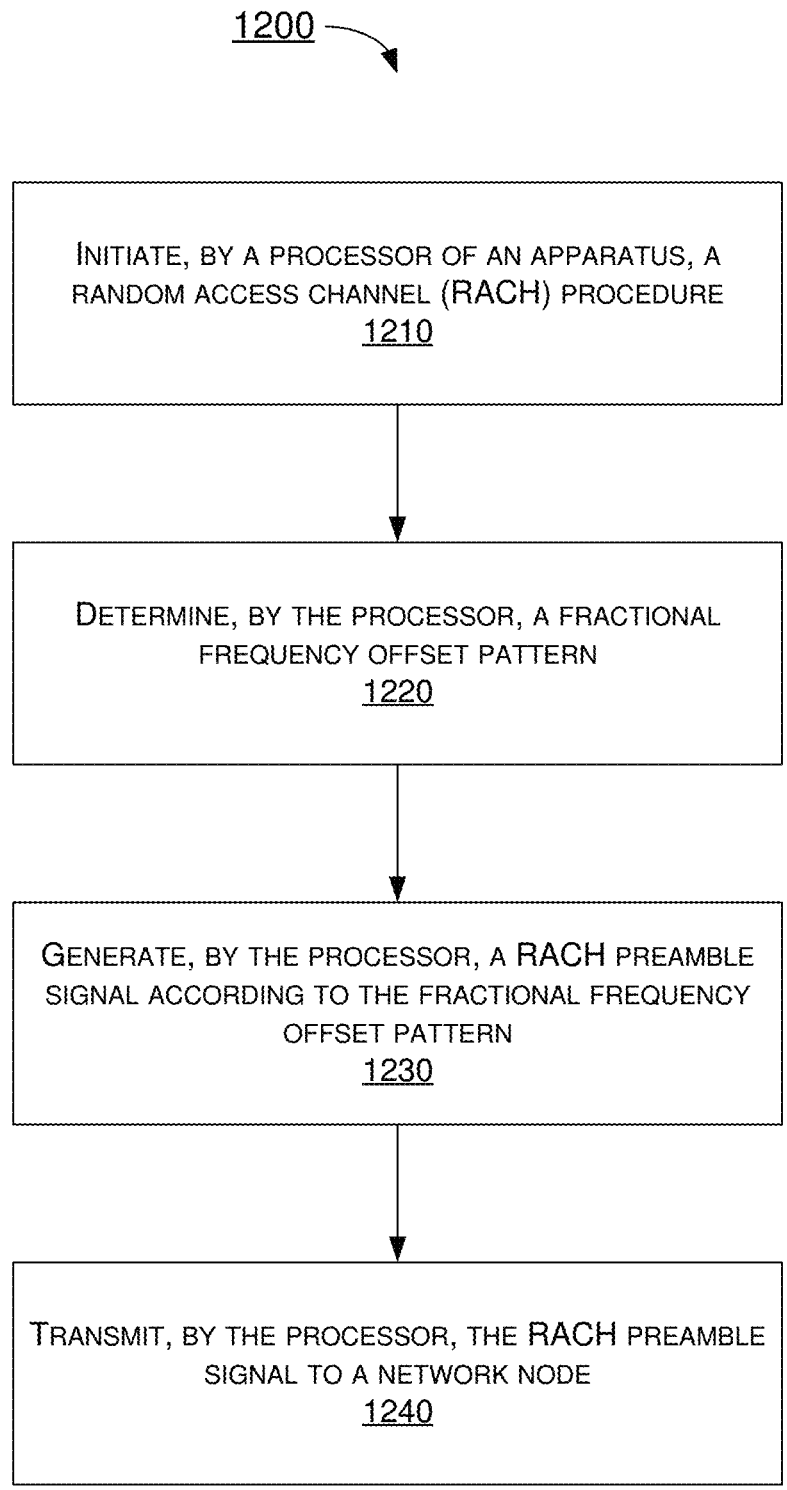
FIG. 12 is a flowchart of an example process in accordance with an implementation of the present disclosure.

FIG. 12 illustrates an example process 1200 in accordance with an implementation of the present disclosure. Process 1200 may be an example implementation of above scenarios/schemes, whether partially or completely, with respect to RACH preamble design in NTN communications with the present disclosure. Process 1200 may represent an aspect of implementation of features of communication apparatus 1110. Process 1200 may include one or more operations, actions, or functions as illustrated by one or more of blocks 1210, 1220, 1230 and 1240. Although illustrated as discrete blocks, various blocks of process 1200 may be divided into additional blocks, combined into fewer blocks, or eliminated, depending on the desired implementation. Moreover, the blocks of process 1200 may executed in the order shown in FIG. 12 or, alternatively, in a different order. Process 1200 may be implemented by communication apparatus 1110 or any suitable UEs or devices. Solely for illustrative purposes and without limitation, process 1200 is described below in the context of communication apparatus 1110. Process 1200 may begin at block 1210.

At 1210, process 1200 may involve processor 1112 of apparatus 1110 initiating a RACH procedure. Process 1200 may proceed from 1210 to 1220.

At 1220, process 1200 may involve processor 1112 determining a fractional frequency offset pattern. Process 1200 may proceed from 1220 to 1230.

At 1230, process 1200 may involve processor 1112 generating a RACH preamble signal according to the fractional frequency offset pattern. Process 1200 may proceed from 1230 to 1240.

At 1240, process 1200 may involve processor 1112 transmitting the RACH preamble signal to a network node.

In some implementations, the fractional frequency offset pattern may comprise a sequence of fractional frequency offset represented by p/N. N denotes a number of symbols in a random access symbol group. p denotes a sequence of integers between −N/2 and N/2.

In some implementations, process 1200 may involve processor 1112 applying the fractional frequency offset pattern post FFT to the random access symbol group in the RACH preamble signal.

In some implementations, process 1200 may involve processor 1112 transmitting the random access symbol group of the RACH preamble signal over N symbols with a total duration $N \cdot N_{fft} + N_{cp}$ chips. $N_{fft}$ denotes a number of FFT. $N_{cp}$ denotes a number of cyclic prefix.

In some implementations, process 1200 may involve processor 1112 determining the fractional frequency offset pattern based on a Costas Array.

In some implementations, process 1200 may involve processor 1112 allocating the fractional frequency offset pattern across preamble sequences based on cyclic shift of a base fractional frequency offset pattern.

In some implementations, process 1200 may involve processor 1112 determining a cyclic shift amount to avoid repeating identical fractional frequency offset pattern across adjacent preamble sequences.

Figure 13:
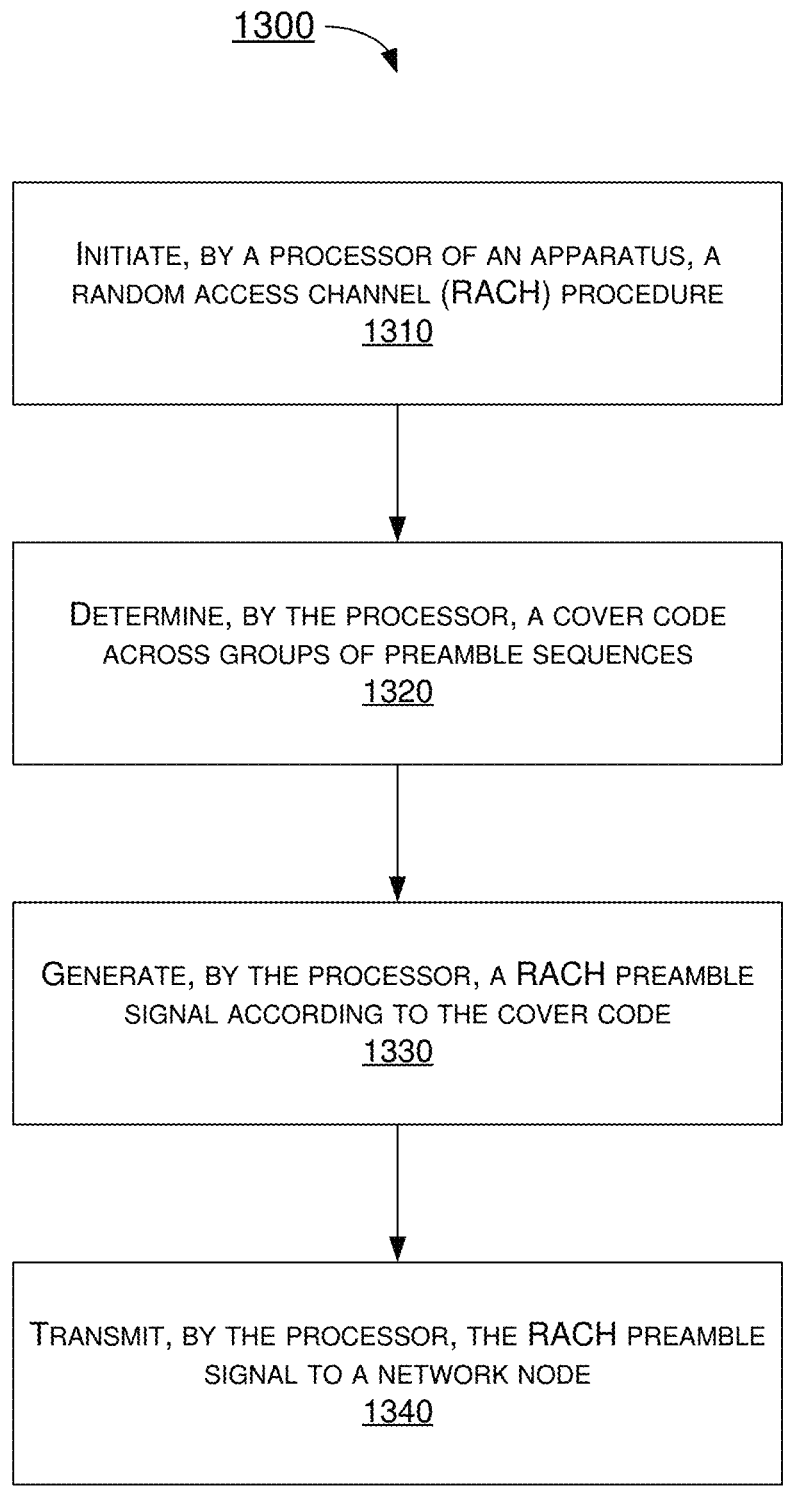
FIG. 13 is a flowchart of an example process in accordance with an implementation of the present disclosure.

FIG. 13 illustrates an example process 1300 in accordance with an implementation of the present disclosure. Process 1300 may be an example implementation of above scenarios/schemes, whether partially or completely, with respect to RACH preamble design in NTN communications with the present disclosure. Process 1300 may represent an aspect of implementation of features of communication apparatus 1110. Process 1300 may include one or more operations, actions, or functions as illustrated by one or more of blocks 1310, 1320, 1330 and 1340. Although illustrated as discrete blocks, various blocks of process 1300 may be divided into additional blocks, combined into fewer blocks, or eliminated, depending on the desired implementation. Moreover, the blocks of process 1300 may executed in the order shown in FIG. 13 or, alternatively, in a different order. Process 1300 may be implemented by communication apparatus 1110 or any suitable UEs or devices. Solely for illustrative purposes and without limitation, process 1300 is described below in the context of communication apparatus 1110. Process 1300 may begin at block 1310.

At 1310, process 1300 may involve processor 1112 of apparatus 1110 initiating a RACH procedure. Process 1300 may proceed from 1310 to 1320.

At 1320, process 1300 may involve processor 1112 determining a cover code across groups of preamble sequences. Process 1300 may proceed from 1320 to 1330.

At 1330, process 1300 may involve processor 1112 generating a RACH preamble signal according to the cover code. Process 1300 may proceed from 1330 to 1340.

At 1340, process 1300 may involve processor 1112 transmitting the RACH preamble signal to a network node.

In some implementations, the cover code may comprise a Hadamard code or a DFT code.

In some implementations, process 1300 may involve processor 1112 allocating the cover code to avoid repeating identical code across the adjacent preamble sequences.

ADDITIONAL NOTES

The herein-described subject matter sometimes illustrates different components contained within, or connected with, different other components. It is to be understood that such depicted architectures are merely examples, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

Further, with respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

Moreover, it will be understood by those skilled in the art that, in general, terms used herein, and especially in the appended claims, e.g., bodies of the appended claims, are generally intended as "open" terms, e.g., the term "including" should be interpreted as "including but not limited to," the term "having" should be interpreted as "having at least," the term "includes" should be interpreted as "includes but is not limited to," etc. It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to implementations containing only one such recitation, even when the same claim includes the introductory phrases "one or more" or "at least one" and indefinite articles such as "a" or "an," e.g., "a" and/or "an" should be interpreted to mean "at least one" or "one or more;" the same holds true for the use of definite articles used to introduce claim recitations. In addition, even if a specific number of an introduced claim recitation is explicitly recited, those skilled in the art will recognize that such recitation should be interpreted to mean at least the recited number, e.g., the bare recitation of "two recitations," without other modifiers, means at least two recitations, or two or more recitations. Furthermore, in those instances where a convention analogous to "at least one of A, B, and C, etc." is used, in general such a construction is intended in the sense one having skill in the art would understand the convention, e.g., "a system having at least one of A, B, and C" would include but not be limited to systems that have A alone, B alone, C alone, A and B together, A and C together, B and C together, and/or A, B, and C together, etc. In those instances where a convention analogous to "at least one of A, B, or C, etc." is used, in general such a construction is intended in the sense one having skill in the art would understand the convention, e.g., "a system having at least one of A, B, or C" would include but not be limited to systems that have A alone, B alone, C alone, A and B together, A and C together, B and C together, and/or A, B, and C together, etc. It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

From the foregoing, it will be appreciated that various implementations of the present disclosure have been described herein for purposes of illustration, and that various modifications may be made without departing from the scope and spirit of the present disclosure. Accordingly, the various implementations disclosed herein are not intended to be limiting, with the true scope and spirit being indicated by the following claims.

What is claimed is:

1. A method, comprising:
   initiating, by a processor of an apparatus, a random access channel (RACH) procedure;
   determining, by the processor, a configuration of a gap in Frequency Domain between RACH preamble resources;
   determining, by the processor, a cover code across a plurality of groups of preamble sequences;
   generating, by the processor, a RACH preamble signal using a frequency hopping pattern based on the configuration to identify different physical RACH (PRACH) sequences; and
   transmitting, by the processor, the RACH preamble signal to a network node,
   wherein the generating of the RACH preamble signal comprises cycling the cover code throughout each preamble sequence of the groups of preamble sequences in combination with applying a fractional frequency offset pattern that is allocated across the preamble sequences based on a cyclic shift of the fractional frequency offset pattern.

2. The method of claim 1, wherein the configuration gap is +/−3.75 kHz between even sequence and odd adjacent sequence in RACH preamble resources.

3. The method of claim 1, wherein the configuration gap is +/−2* max residual Frequency Offset between RACH preamble resources.

4. The method of claim 1, wherein the configuration gap is used to reduce collision/correlation of adjacent sequences in RACH preamble resources.

5. An apparatus, comprising:
   a transceiver which, during operation, wirelessly communicates with a network node of a wireless network; and
   a processor communicatively coupled to the transceiver such that, during operation, the processor performs operations comprising:
   initiating, via the transceiver, a random access channel (RACH) procedure;
   determining a configuration of a gap in Frequency Domain between RACH preamble resources;
   determining a cover code across a plurality of groups of preamble sequences;
   generating a RACH preamble signal using a frequency hopping pattern based on the configuration to identify different physical RACH (PRACH) sequences; and
   transmitting, via the transceiver, the RACH preamble signal to a network node,
   wherein the generating of the RACH preamble signal comprises cycling the cover code throughout each preamble sequence of the groups of preamble sequences in combination with applying a fractional frequency offset pattern that is allocated across the preamble sequences based on a cyclic shift of the fractional frequency offset pattern.

6. The apparatus of claim 5, wherein the configuration gap is +/−3.75 kHz between even sequence and odd adjacent sequence in RACH preamble resources.

7. The apparatus of claim 5, wherein the configuration gap is +/−2* max residual Frequency Offset between RACH preamble resources.

8. The apparatus of claim 5, wherein the configuration gap is used to reduce collision/correlation of adjacent sequences in RACH preamble resources.

* * * * *